United States Patent
Kreiling et al.

(10) Patent No.: US 7,013,186 B2
(45) Date of Patent: Mar. 14, 2006

(54) SWITCHGEAR CABINET MONITORING AND CONTROL ARRANGEMENT

(75) Inventors: Jörg Kreiling, Biebertal (DE); Markus Hain, Dillenburg (DE); Michael Seelbach, Freudenberg (DE)

(73) Assignee: Rittal Rudolf Loh GmbH & Co. KG, Herborn (DE)

( * ) Notice: Subject to any disclaimer, the term of this patent is extended or adjusted under 35 U.S.C. 154(b) by 894 days.

(21) Appl. No.: 09/788,319

(22) Filed: Feb. 16, 2001

(65) Prior Publication Data

US 2001/0047405 A1    Nov. 29, 2001

(30) Foreign Application Priority Data

Feb. 17, 2000    (DE) .............................. 100 07 271

(51) Int. Cl.
G05B 11/01    (2006.01)
(52) U.S. Cl. ..................... 700/22; 700/17; 700/286; 700/10; 700/295; 345/759
(58) Field of Classification Search ................ 700/22, 700/17, 286, 10, 295; 345/759, 764, 765; 361/605; 307/112–113, 115–116, 119, 134, 307/125–126; 715/759, 764, 765
See application file for complete search history.

(56) References Cited

U.S. PATENT DOCUMENTS

| | | | | |
|---|---|---|---|---|
| 4,916,628 A | * | 4/1990 | Kugler | 700/286 |
| 5,557,545 A | * | 9/1996 | Loffel et al. | 700/286 |
| 5,764,155 A | * | 6/1998 | Kertesz et al. | 700/295 |
| 5,768,148 A | * | 6/1998 | Murphy et al. | 700/286 |
| 6,363,422 B1 | * | 3/2002 | Hunter et al. | 709/224 |
| 2003/0061335 A1 | * | 3/2003 | Thomas et al. | 709/223 |

* cited by examiner

*Primary Examiner*—Anthony Knight
*Assistant Examiner*—Thomas Pham
(74) *Attorney, Agent, or Firm*—Pauley Petersen & Erickson

(57) ABSTRACT

A switchgear cabinet monitoring and control arrangement with several switchgear cabinet monitoring and control devices connected to a network, and with at least one personal computer, which is in communication with the devices through the network. Simple operation is achieved because the at least one personal computer is connected to the network by a web browser. A server is assigned to a group of the switchgear cabinet monitoring and control devices, in which a management device containing information regarding the switchgear cabinet monitoring and control devices stored therein and including their respective identification, is arranged. The information can be called up using the at least one personal computer.

12 Claims, 1 Drawing Sheet

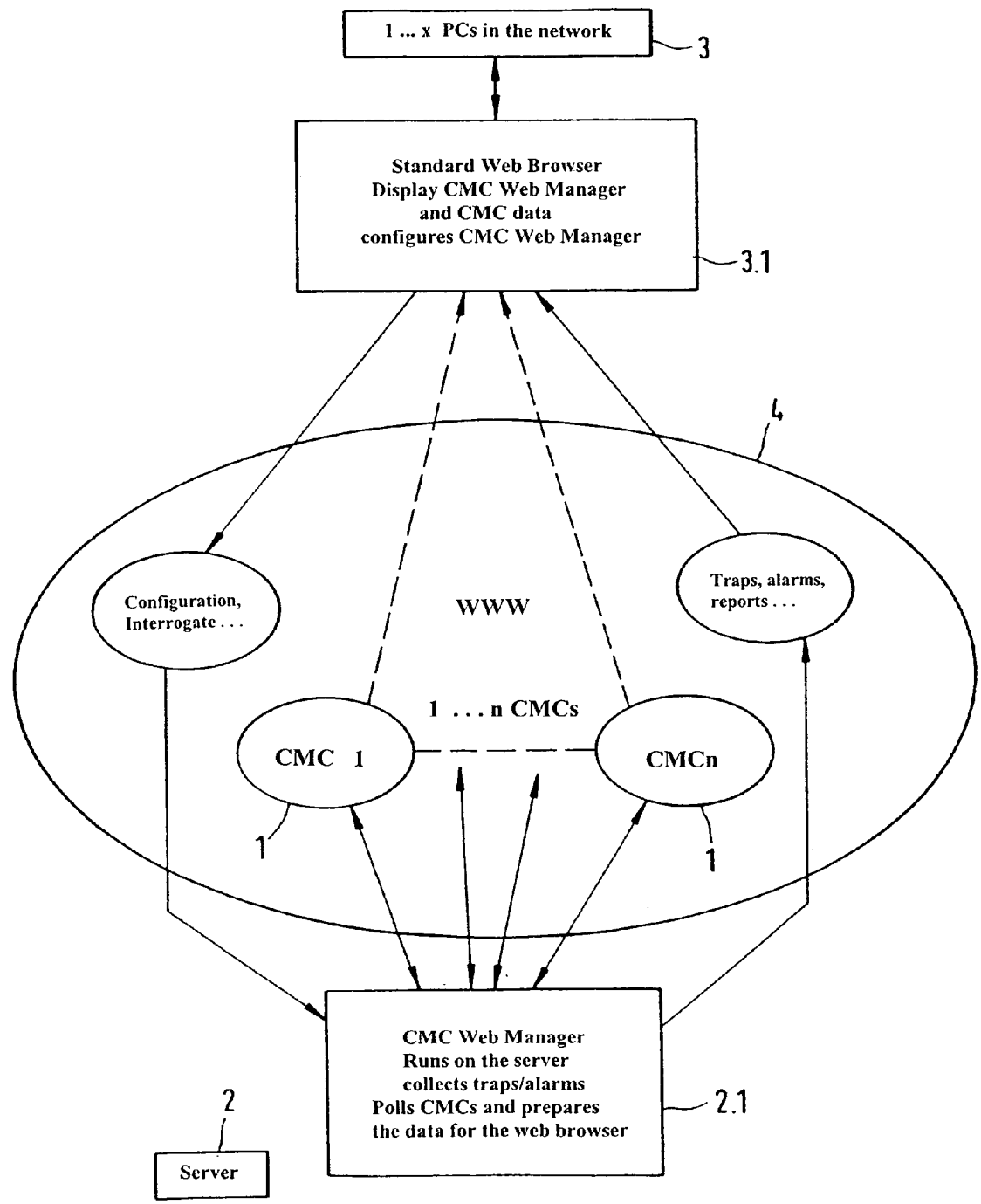

SWITCHGEAR CABINET MONITORING AND CONTROL ARRANGEMENT

BACKGROUND OF THE INVENTION

1. Field of the Invention

This invention relates to a switchgear cabinet monitoring and control arrangement with several switchgear cabinet monitoring and control devices connected to a network, and with at least one personal computer, which is in communication with the devices through the network.

2. Description of Related Art

A switchgear monitoring and control arrangement of this type is described by German Patent Reference DE 196 15 469 A1. This switchgear monitoring and control arrangement is a part of a switchgear cabinet airconditioning device with cooling units, wherein control devices are assigned to the individual cooling units and are connected to a bus bar for linkage. An external computer, in the form of a personal computer, is also connected to the bus, and the bus is connected to a higher standard bus system having a coupling device. For organizing the monitoring and control functions, one control device is arranged as the master and the remaining ones as slaves.

Such a structure of the arrangement requires relatively detailed individual knowledge from the user regarding the properties and programming of the control devices and an appropriate familiarization time.

In connection with a switchgear cabinet monitoring and control arrangement shown in German Patent Reference DE 196 09 689 A1, a sensor arrangement with several sensors, such as a humidity sensor, a door limit switch, a vibration sensor, a smoke detector, a current test switch, a voltage test switch, for example, and also a voltage supply device with an operating data monitor, besides airconditioning components, is connected with the monitoring and control arrangement. The monitoring and control arrangement can be connected with a bus system with one output and with a personal computer, by another output. Multiple monitoring and control functions can be performed in a switchgear cabinet with such a monitoring and control device, however settings and adjustments of the monitoring and control device for adapting it to the different conditions of use in a switchgear cabinet are relatively elaborate.

SUMMARY OF THE INVENTION

One object of this invention is to provide a switchgear cabinet monitoring and control arrangement which offers simple and variable employment and a simple operation.

This object is attained with this invention which has the characteristics described in this specification and the claims. In accordance with this invention, at least one personal computer is connected to the network with a web browser. A server is assigned to a group of the switchgear cabinet monitoring and control devices, in which is arranged a management device containing information regarding the switchgear cabinet monitoring and control devices stored therein and including their respective identification. The information can be called up by the at least one personal computer.

The management device provided in the server in the form of software programs permits a simple exchange and simple processing of data transmitted between it and the switchgear cabinet monitoring and control devices and, if desired, also a change in management. With personal computers it is possible to call up information through the server via the higher network, for example the Internet, an ethernet or other similar networks, which are generally accessible using standardized steps, which are connected to the network at arbitrary positions. The data of the information can be changed for acting on the switchgear cabinet monitoring and control devices from the personal computer. With the web browser it is possible to represent the information called up from the management device, as well as information to be transmitted from the personal computer to the management device, in a well arranged manner and to process it simply.

An embodiment which is more advantageous for a simple arrangement has control commands stored in the management device, by which the switchgear cabinet monitoring and control devices can be selectively triggered as a function of interrogation data and/or status change data for performing control functions and/or monitoring functions received from the management device. The interrogation data are transmitted by one of the personal computers, and the status change data by one or several switchgear cabinet monitoring and control devices. Thus it is also possible to assign to the switchgear cabinet monitoring and control devices different control commands contained in appropriate data sets, and to respectively change them separately and to call them up when desired. The assignment to the respective switchgear cabinet monitoring and control devices is assured by their respective identifications. Thus it is possible to minimize the outlay for handling the data in the switchgear cabinet monitoring and control devices.

In one embodiment of the arrangement for a simple and well arranged operation and manipulation, preset values and/or functional monitoring or controlling processes for the operation of the switchgear cabinet monitoring and control devices can be input into the latter or into the management device, can be changed therein or canceled therefrom on the basis of the personal computers configuration data. With these steps the configuration of the switchgear cabinet monitoring and control device is simplified.

Further advantageous steps include that the management device can be configured from the server and/or the personal computers.

The steps, where information stored in the management device includes operating data regarding the switchgear cabinet monitoring and control devices, which can be called up by personal computers and can be displayed in accordance with operating instructions on a screen of the personal computer by the web browser, also further add to a rapid and well arranged operation by an untrained user.

If at least some of the status change data can be automatically input from the switchgear cabinet monitoring and control devices to the server and/or from the server to the personal computers, then important data can be transmitted to the management device even without a specific request from the latter and can be further processed for triggering a suitable control process and/or for the information of the user.

In this connection, for a suitable selection of the status changes to be output the switchgear cabinet monitoring and control devices and/or the management device have an evaluation stage, by which the status changes, which have to be automatically issued, can be selected in accordance with decision criteria which are preset in a fixed or a variable manner.

An arrangement for connection between the server and the associated switchgear cabinet monitoring and control devices has groups of switchgear cabinet monitoring and control devices that are connected with an associated server via an internal network.

The above mentioned status changes relate either to status changes detected by sensors connected to the switchgear cabinet monitoring and control device, or status changes within the switchgear cabinet monitoring and control device, for a diagnosis of the switchgear cabinet monitoring and control device.

BRIEF DESCRIPTION OF THE DRAWINGS

This invention will be explained in greater detail by an exemplary embodiment and by reference to the drawings, wherein the single drawing FIGURE represents a block diagram of a switchgear cabinet monitoring and control device for a switchgear cabinet.

DESCRIPTION OF PREFERRED EMBODIMENTS

The switchgear cabinet monitoring and control arrangement for information relating to the switchgear cabinet itself shown in the drawing FIGURE has switchgear cabinet monitoring and control devices 1 (symbolized by CMC1 ... CMCn), a server 2, which is connected with the control devices 1 via a network and in which a management device 2.1 is provided by means of appropriate programming, as well as one of several personal computers 3 with an associated web browser 3.1, which in particular is a standardized web browser known per se, for example an Internet explorer, netscape communicator, or the like. The personal computers 3 are connected via the web browser 3.1 to the network 4, for example the internet, intranet or ethernet, and thus are connected with the server, which is also connected to the network 4. The connection between the switchgear cabinet monitoring and control devices 1 associated with the server 2, whose number can be n or a larger or lesser number and can also be variable, is provided either also via the network 4, or via an internal net, for example within a room or a building. The internal net can be designed to be star-shaped, ring-shaped or in the form of a tree structure, in a known manner. Several arrangement of groups of switchgear cabinet monitoring and control devices 1 with associated servers and management devices 2.2 installed therein can be connected to the network 4. The management device 2.1 is advantageously operated on a windows server 2.

The management devices 2.1 make so-called web sites available, which can be called up by every personal computer 3, or computer work station in the network 4, and can be displayed in a well organized manner by means of the web browser 3.1.

The management device 2.1 itself can recognize the switchgear cabinet monitoring and control devices 1 connected to the network 4, or to the internal net by means of their respective identification. The data of the switchgear cabinet monitoring and control devices 1 are processed for transmission via the network 4 by means of the management device 2.1 in particular, so that they can be displayed by the computer work stations, or personal computers 3, at any arbitrary location in the network 4 by means of the web browser 3.1. Configuration of the management device 2.1 can take place locally at the server 2, or via the web browser 3.1 from every computer work station in the network. The switchgear cabinet monitoring and control devices 1 can be configured via the web browser 3.1 by any of the personal computers 3 connected to the network in order to enter or change set values, for example, or to preset or change control processes.

With the described design it is possible to initiate the further functions mentioned above, in particular interrogations from the personal computer 3, or information contained in the management device 2.1 or also in the switchgear cabinet monitoring and control devices 1, such as alarms, status changes within the particular switchgear cabinet or within the switchgear cabinet monitoring and control devices 1, and similar reports can be transmitted to the personal computers 3 via the management device 2.1. It is also possible in particular to store operating data, such as an operating instruction for the respective switchgear cabinet monitoring and control devices and/or exploded drawings for assembling them, for example, which are advantageously deposited in the management device 2.1 so that they can be called up.

As an alternative, defined data of the switchgear cabinet monitoring and control devices 1 can be directly transmitted to the personal computers 3 if, for example, an error occurs in the management device and it is necessary to transmit important information.

What is claimed is:

1. In a switchgear cabinet monitoring and control arrangement with several switchgear cabinet monitoring and control devices (1) connected to a network (4), and with at least one personal computer (3), which is in communication with the devices through the network (4), the improvement comprising:

the at least one personal computer (3) connected to the network (4) by a web browser (3.1);

a server (2) assigned to a group of the switchgear cabinet monitoring and control devices (1) in which is arranged a management device (2.1) containing information regarding the switchgear cabinet monitoring and control devices (1) stored therein and including their respective identification; and the information can be called up by the at least one personal computer (3) through the web browser;

wherein at least some status change data of a switchgear cabinet can be automatically input from at least one of the switchgear cabinet monitoring and control devices (CMC1 ... CMCn) to the server (2) and the server (2) to the personal computers (3); and wherein at least one of the switchgear cabinet monitoring and control devices (CMC1 ... CMCn) and the management device (2.1) each has an evaluation stage by which automatically issued status changes of a switch gear cabinet are selected in accordance with a decision criteria.

2. In the switchgear cabinet monitoring and control arrangement in accordance with claim 1, wherein a plurality of control commands are stored in the management device (2.1) by which the switchgear cabinet monitoring and control devices (1) can be selectively triggered as a function of at least one of interrogation data and status change data for at least one of performing control functions and monitoring functions received from the management device (2.1), wherein the interrogation data are transmitted by one of the personal computers (3), and status change data by at least one of the switchgear cabinet monitoring and control devices (CMC1 ... CMCn).

3. In the switchgear cabinet monitoring and control arrangement in accordance with claim 2, wherein from the personal computers (3) at least one of configuration data, preset values and functional processes of monitoring or controlling for an operation of the switchgear cabinet monitoring and control devices (CMC1 . . . CMCn) can be input into at least one of the switchgear cabinet monitoring and control devices and the management device (2.1) can be one of changed and canceled.

4. In the switchgear cabinet monitoring and control arrangement in accordance with claim 3, wherein the management device (2.1) is configured from at least one of the server (2) and the personal computers (3).

5. In the switchgear cabinet monitoring and control arrangement in accordance with claim 4, wherein the information stored in the management device (2.1) includes operating data regarding the switchgear cabinet monitoring and control devices (CMC1 . . . CMCn) which can be called up by the personal computers (3) and can be displayed on a screen of the personal computer (3) in accordance with operating instructions of the web browser (3.1).

6. In the switchgear cabinet monitoring and control arrangement in accordance with claim 5, wherein status change data are called up from the management device (2.1) upon an initiative in accordance with predetermined response data one of chronologically and on a basis of response data is sent by the switchgear cabinet monitoring and control devices (CMC1 . . . CMCn).

7. In the switchgear cabinet monitoring and control arrangement in accordance with claim 6, wherein groups of the switchgear cabinet monitoring and control devices (CMC1 . . . CMCn) are connected with the respectively associated server (2) via an internal network.

8. In the switchgear cabinet monitoring and control arrangement in accordance with claim 2, wherein status change data are called up from the management device (2.1) upon an initiative in accordance with predetermined response data one of chronologically and on a basis of response data is sent by the switchgear cabinet monitoring and control devices (CMC1 . . . CMCn).

9. In the switchgear cabinet monitoring and control arrangement in accordance with claim 1, wherein from the personal computers (3) at least one of configuration data, preset values and functional processes of monitoring or controlling for an operation of the switchgear cabinet monitoring and control devices (CMC1 . . . CMCn) can be input into at least one of the switchgear cabinet monitoring and control devices and the management device (2.1) can be one of changed and canceled.

10. In the switchgear cabinet monitoring and control arrangement in accordance with claim 1, wherein the management device (2.1) is configured from at least one of the server (2) and the personal computers (3).

11. In the switchgear cabinet monitoring and control arrangement in accordance with claim 1, wherein the information stored in the management device (2.1) includes operating data regarding the switchgear cabinet monitoring and control devices (CMC1 . . . CMCn) which can be called up by the personal computers (3) and can be displayed on a screen of the personal computer (3) in accordance with operating instructions of the web browser (3.1).

12. In the switchgear cabinet monitoring and control arrangement in accordance with claim 1, wherein groups of the switchgear cabinet monitoring and control devices (CMC1 . . . CMCn) are connected with the respectively associated server (2) via an internal network.

* * * * *